March 19, 1940.  H. L. HIRSCHLER ET AL  2,194,305
TOTALIZER SYSTEM
Filed July 23, 1934  10 Sheets-Sheet 2
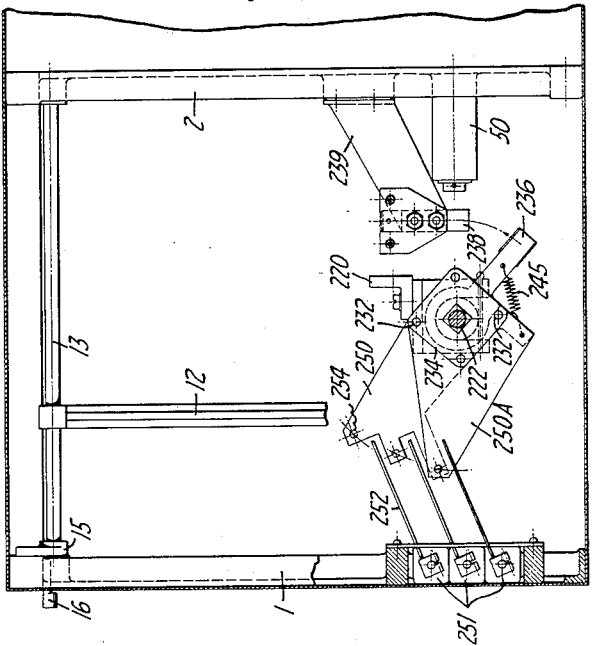
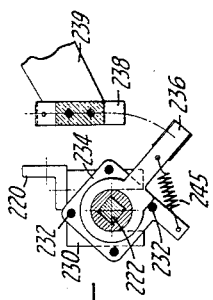
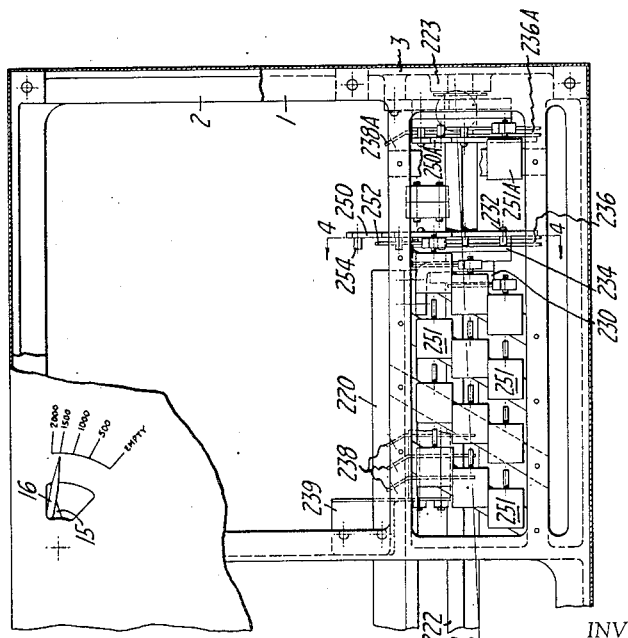
INVENTORS
Horace L. Hirschler
Fuller A. Crooks
Fred K. R. Richter
BY
ATTORNEY.

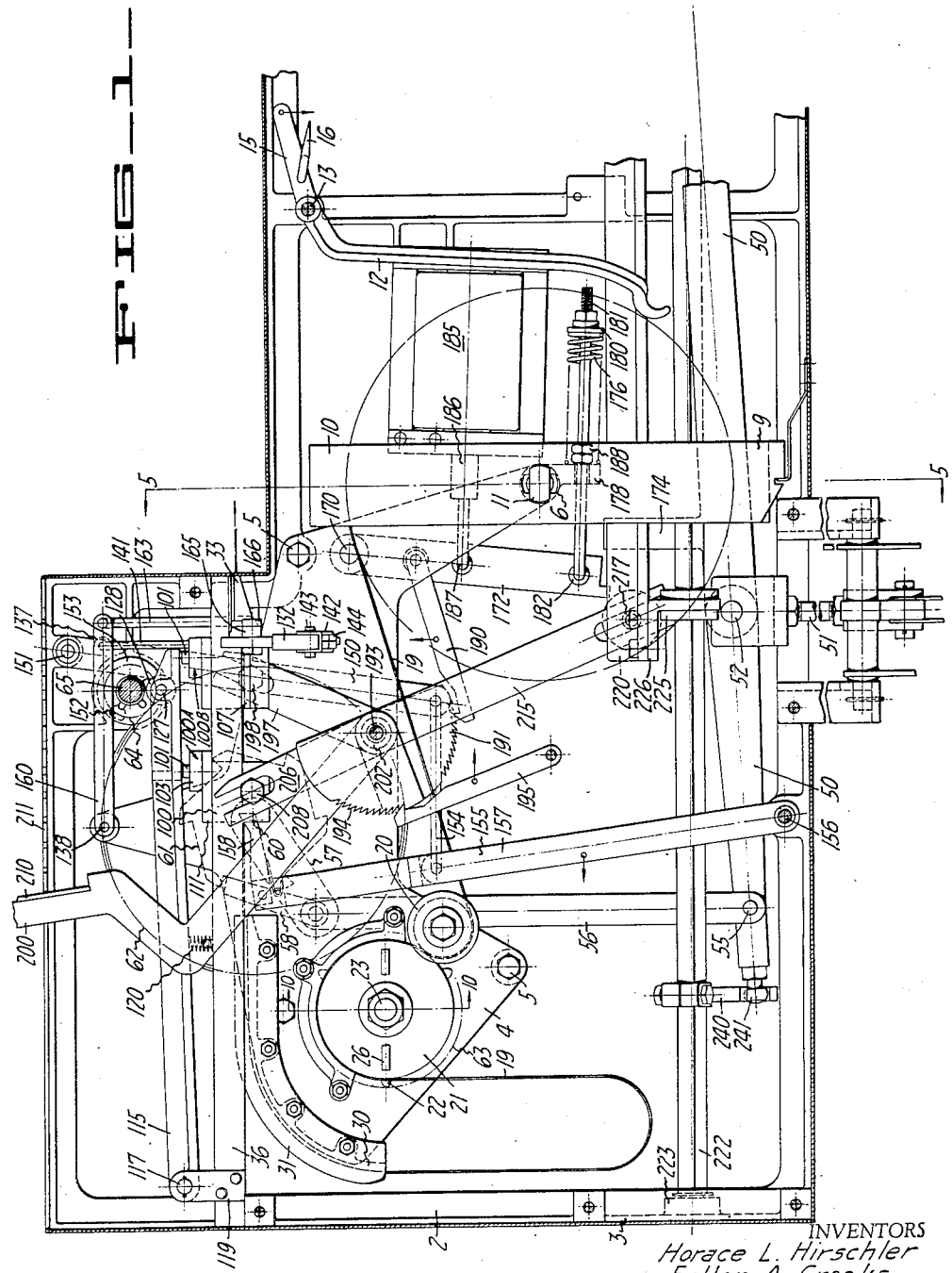

March 19, 1940.  H. L. HIRSCHLER ET AL  2,194,305
TOTALIZER SYSTEM
Filed July 23, 1934    10 Sheets-Sheet 3
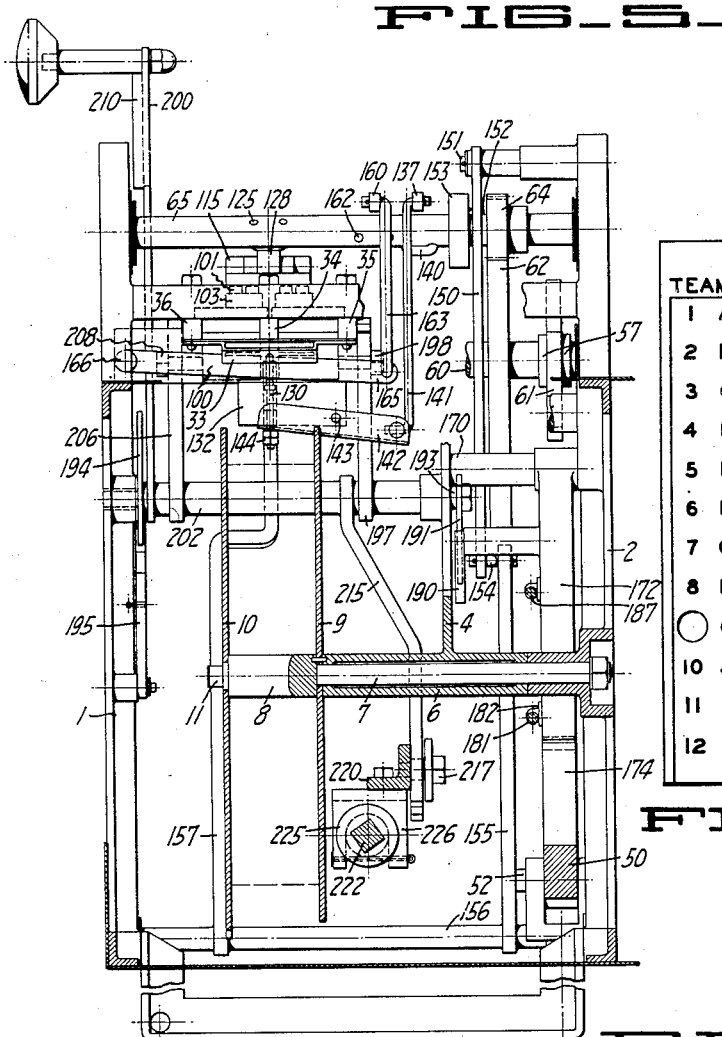
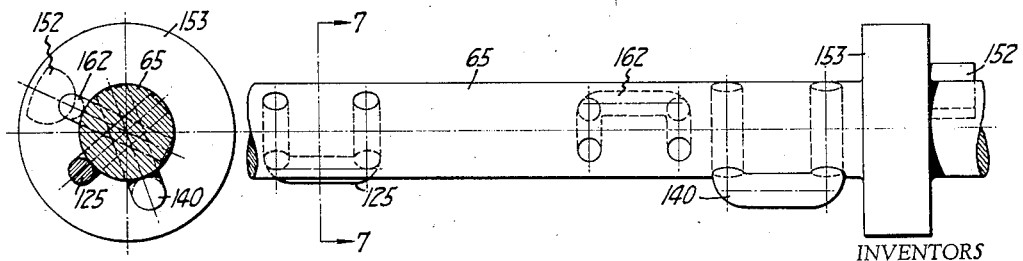
INVENTORS
Horace L. Hirschler
Fuller A. Crooks
Fred K. R. Richter
BY
ATTORNEY.

March 19, 1940.    H. L. HIRSCHLER ET AL    2,194,305
TOTALIZER SYSTEM
Filed July 23, 1934    10 Sheets-Sheet 4
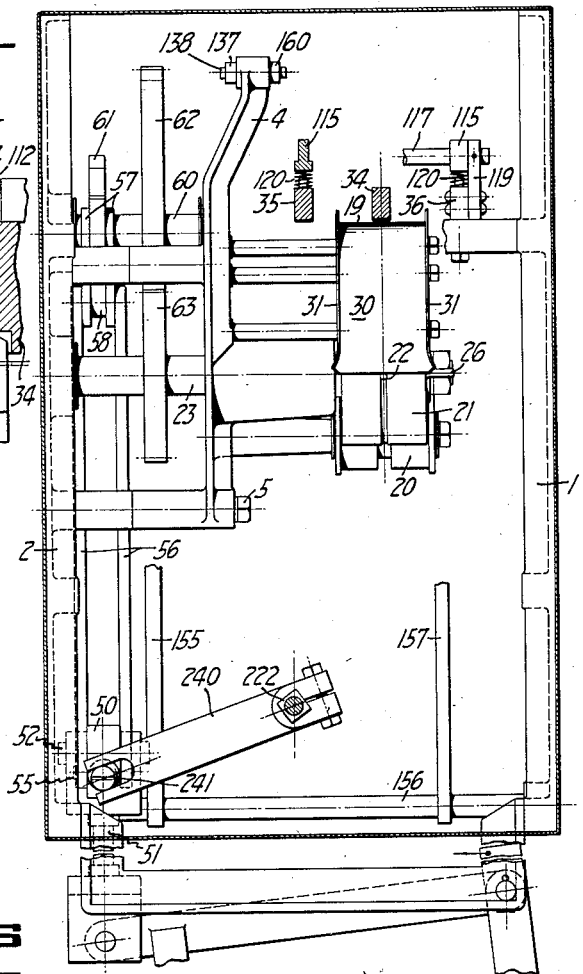
FIG_8_
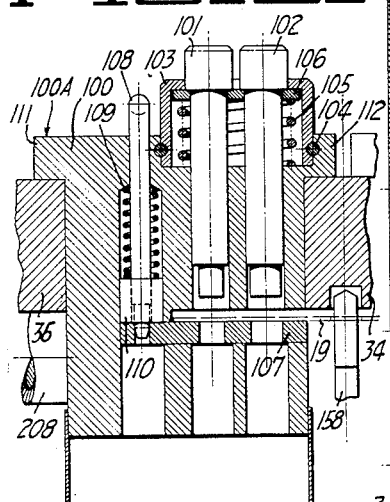
FIG_9_
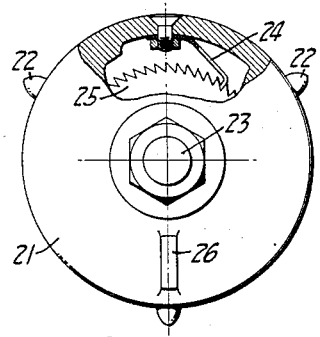
FIG_11_
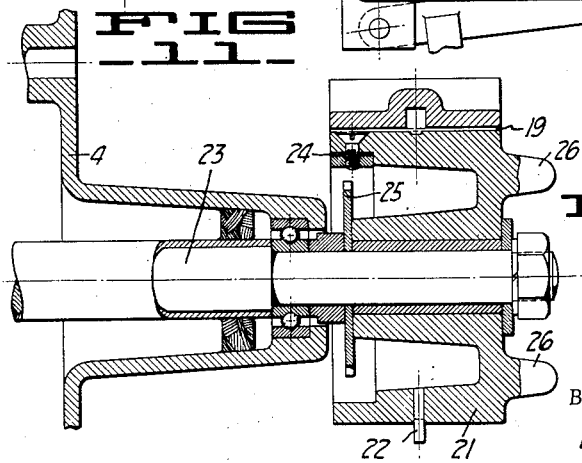
FIG_10_
INVENTORS
Horace L. Hirschler
Fuller A. Crooks
Fred K. R. Richter
BY Theodore␣␣␣␣␣␣
ATTORNEY.

March 19, 1940.    H. L. HIRSCHLER ET AL    2,194,305
TOTALIZER SYSTEM
Filed July 23, 1934    10 Sheets-Sheet 5
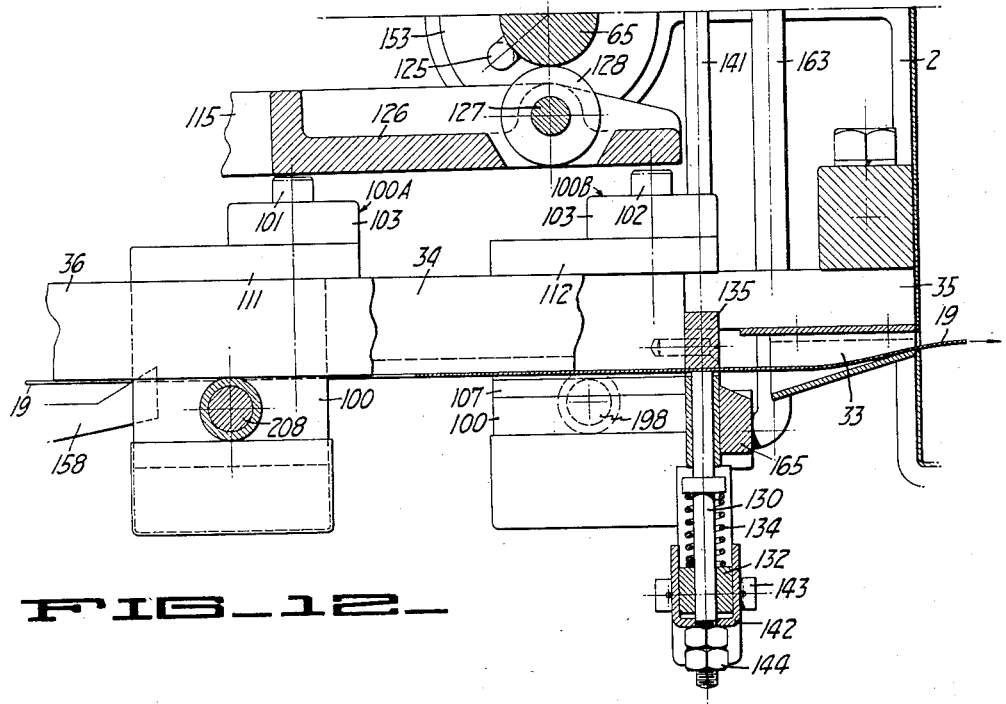
FIG_12_
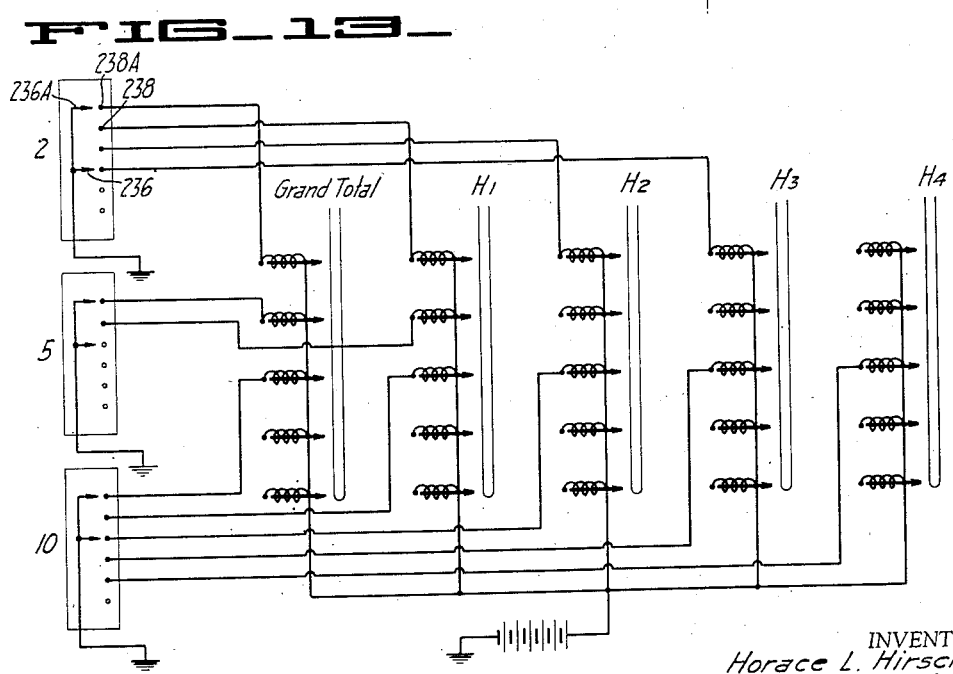
FIG_13_
INVENTORS
Horace L. Hirschler
Fuller A. Crooks
Fred K. R. Richter
BY
ATTORNEY.

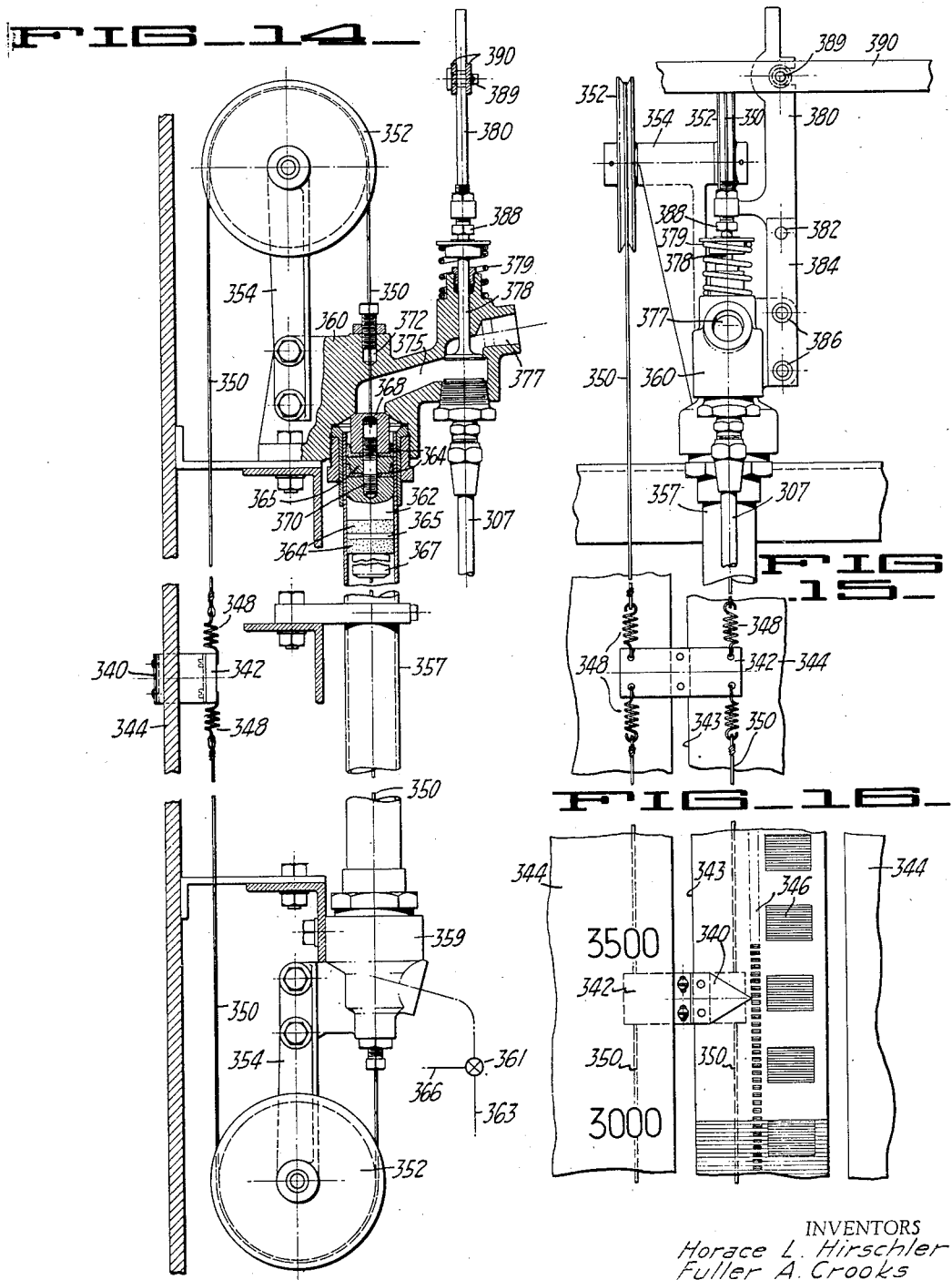

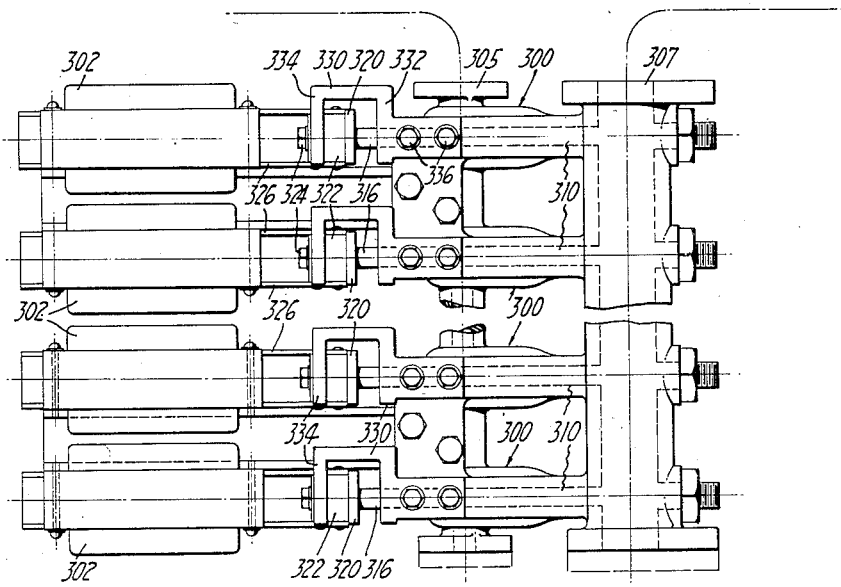
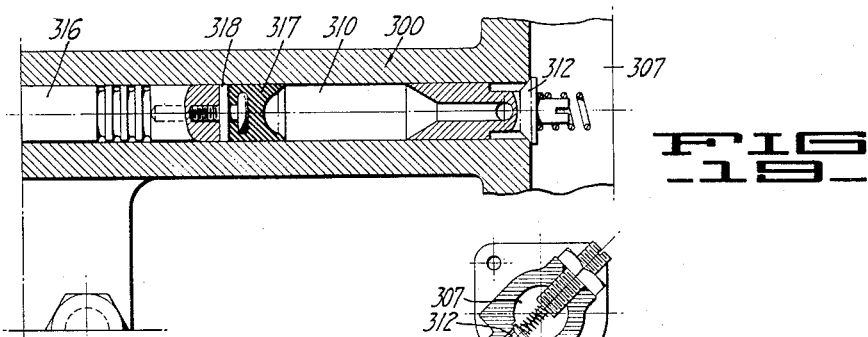
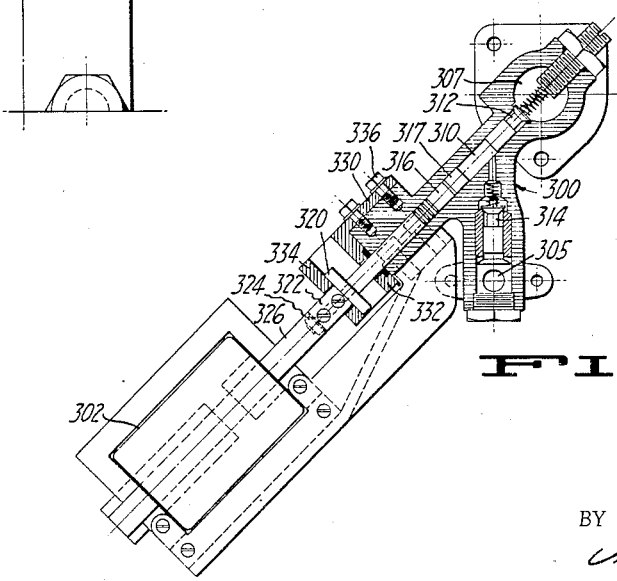

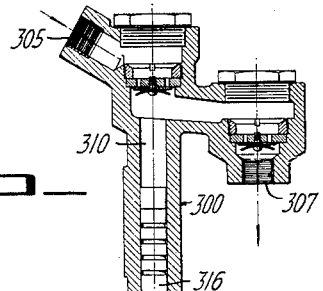
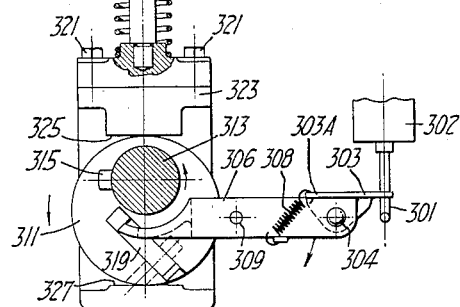
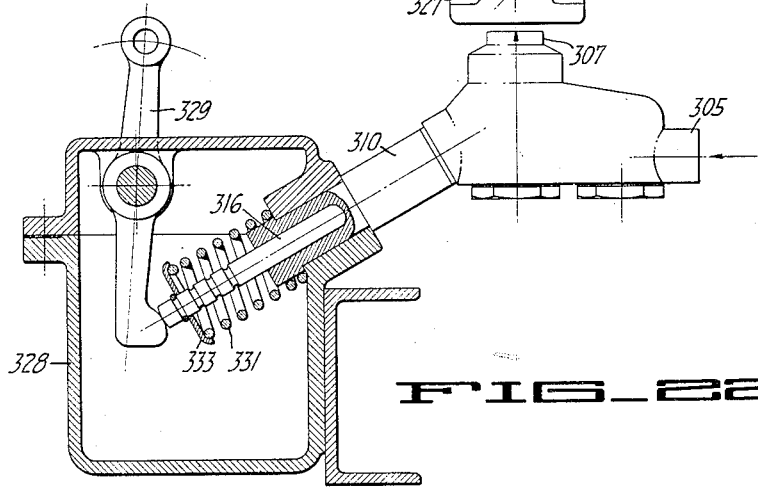

March 19, 1940.  H. L. HIRSCHLER ET AL  2,194,305
TOTALIZER SYSTEM
Filed July 23, 1934    10 Sheets-Sheet 9
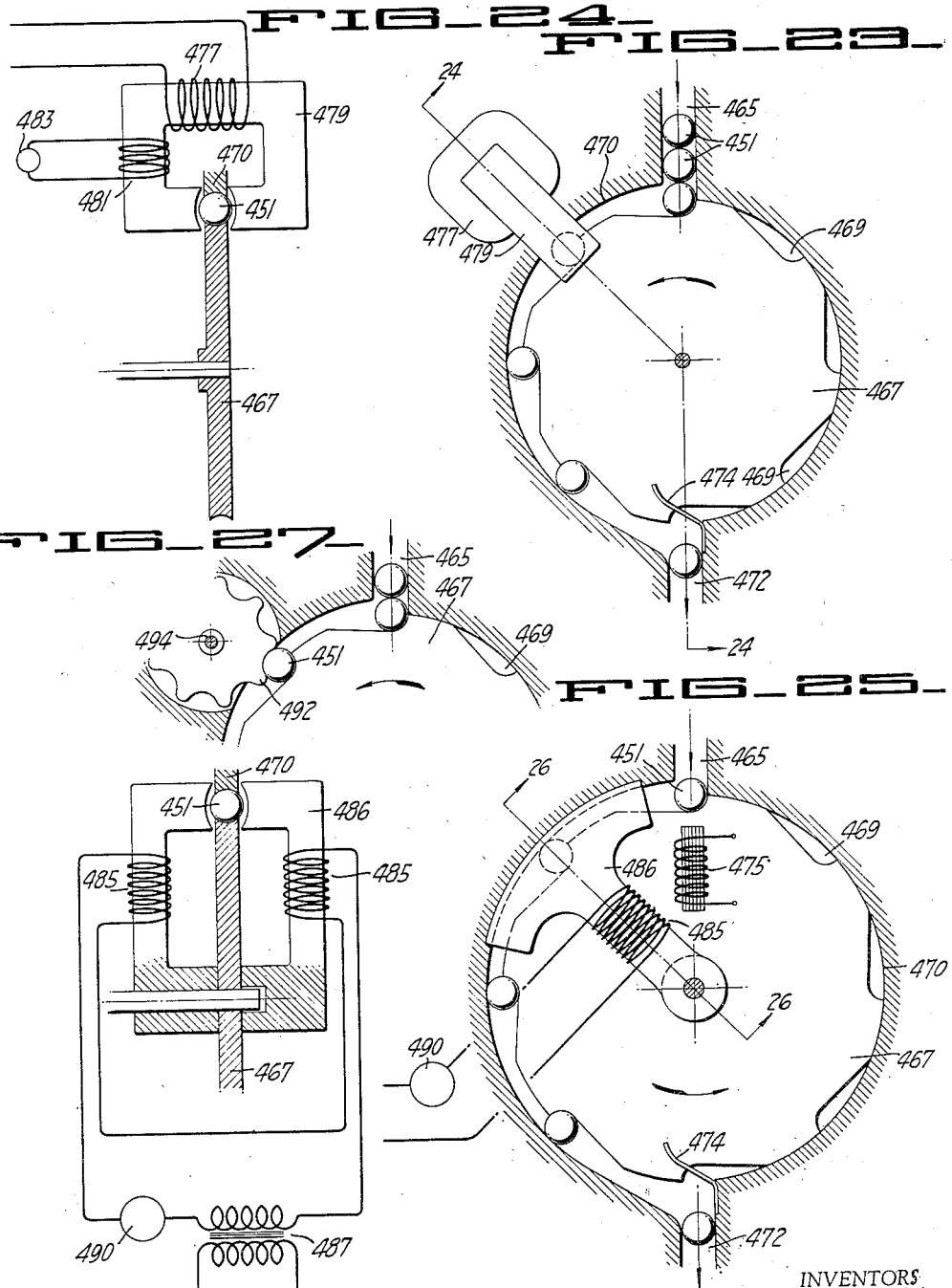

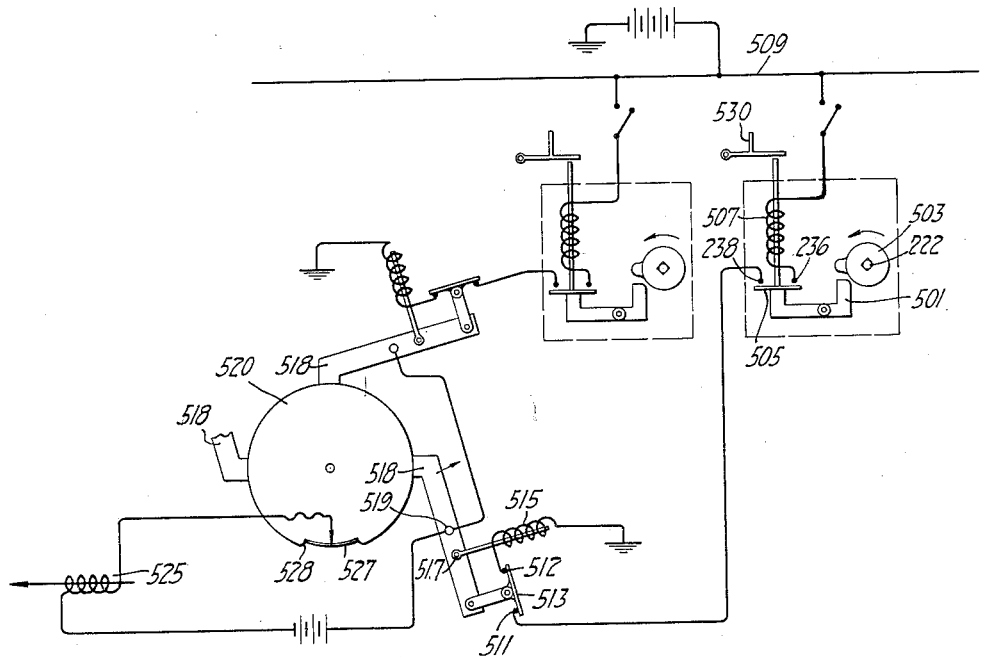
FIG_29_
FIG_28_
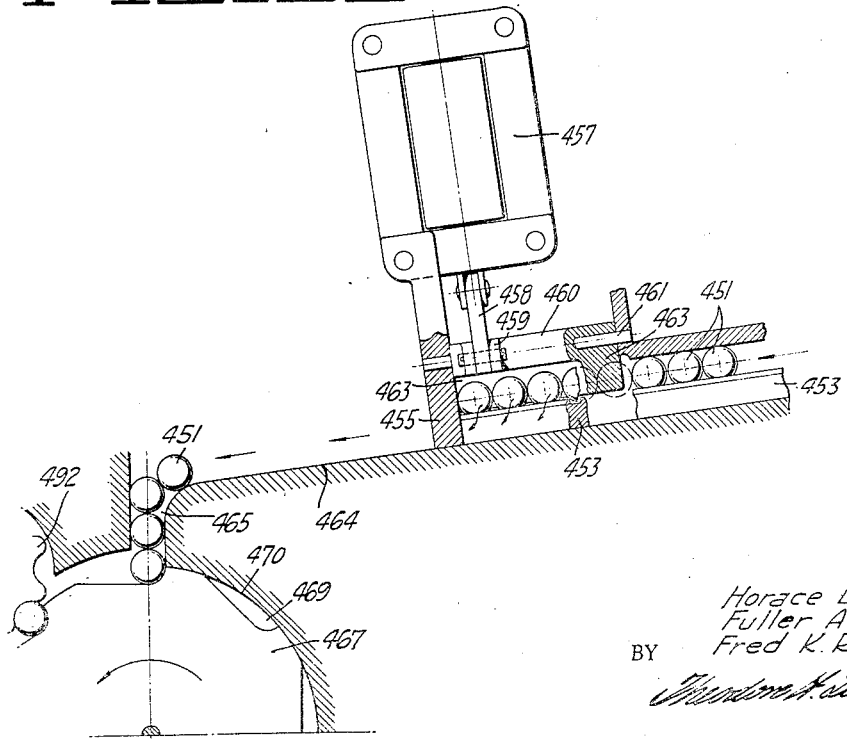

Patented Mar. 19, 1940

2,194,305

UNITED STATES PATENT OFFICE 2,194,305

TOTALIZER SYSTEM

Horace L. Hirschler, Fuller A. Crooks, and Fred K. R. Richter, San Francisco, Calif., assignors, by direct and mesne assignments, to Thomas A. Keen, San Mateo County, Calif.

Application July 23, 1934, Serial No. 736,514

2 Claims. (Cl. 164—111)

The present invention relates to totalizing apparatus of the type sometimes known in the art as "totalizators," designed for the particular purpose of obtaining totals of bets placed at a number of machines on each of a plurality of horses or other participants, in a race or other contest.

The present invention contemplates the provision of a complete system adapted to the foregoing use, which system comprises a ticket issuing machine having many novel and advantageous features, and designed to issue as a receipt to each wagerer a punched ticket setting forth the terms of the wager. It is contemplated that a large number of such ticket issuing machines will be used and the invention provides means whereby each machine, as an incident to the issuance of each ticket, will control the operation of one or more mechanisms for totalizing the amount of all bets placed upon each participant in the contest and in addition, if desired, a grand total of the amount of all bets placed upon all participants in a given contest. It will also be evident that by otherwise interconnecting the ticket issuing machines, other groupings of the data may be obtained.

The totalizing apparatus, operating under control of the ticket issuing machine may be any of a plurality of different types; hydraulic, mechanical, and electrical forms and combinations thereof being disclosed hereinafter. Also, if desired, the grand totalizer may be equipped with special controlling machanism whereby the amount of taxes, track commissions, et cetera, will be automatically subtracted from the indicated grand total so as to accurately indicate the payable odds when such totalizer is read in conjunction with the totalizer pertaining to a single participant.

It is an object of the present invention to provide a system of the type described which is positive and accurate in operation, yet distinctly less complex in construction than similar systems in the prior art.

Another object of the present invention is to provide novel controls and locking devices whereby either fraudulent or inadvertent misoperation of the system is prevented.

Another object of the present invention is the provision in an hydraulic totalizer system of means for automatically eliminating entrained air or other gases as an incident to the normal operation of the system.

Another object of the invention is the provision of means whereby the totalizing apparatus may be readily changed to adapt it to register any of a plurality of values.

Other objects will appear in the course of the following specification and claims.

The novel features characteristic of the present invention are set forth with particularity in the appended claims. The invention itself, however, both as to its organization and its method of operation, together with additional objects and advantages thereof, will best be understood from the following description of the specific embodiment when read in connection with the accompanying drawings in which:

Figures 1 and 2 are frontal elevations, with certain parts removed showing the ticket issuing and totalizer circuit controlling mechanisms.

Figure 1A is a view of one of the tickets of the type used in the machine, showing the central feeding perforation, and the perforations made by the punching dies of the machine.

Figure 3 is an end elevation of the mechanisms shown in Figure 2, with casing and frame members removed.

Figure 4 is a detail section of the switch mechanism, taken on the line 4—4 of Figure 2.

Figure 5 is a lateral section, taken on the line 5—5 of Figure 1.

Figure 6 is a detail, in elevation, of a portion of the ticket machine cam shaft.

Figure 7 is a sectional view of this cam shaft taken on the line 7—7 of Figure 6.

Figures 8 is a left end elevation of the mechanism of Figure 1.

Figure 9 is a detail, in section, of one of the ticket punching assemblies.

Figure 10 is a detail, in section, of the ticket strip feeding drum.

Figure 11 is a right end elevation thereof.

Figure 12 is an enlarged detail, partly in section, of the punch operating devices and cooperating mechanism.

Figure 13 is a diagram of circuit connections between several ticket issuing machines and totalizers.

Figure 14 is a side elevation, partly in section, of the hydraulic totalizer.

Figure 15 is a front elevation thereof with certain parts removed.

Figure 16 is a detail view of the scale and pointer arrangement thereof.

Figure 17 is a plan view of one form of the hydraulic totalizer controlling mechanism.

Figure 18 is a longitudinal sectional view of one of the pumps thereof.

Figure 19 is an enlarged detail, partly in section, of a portion of the pump mechanism, showing the piston construction.

Figure 20 is a longitudinal sectional view of an alternative form of hydraulic totalizer controlling mechanism.

Figure 21 is a detail view of the clutch mechanism thereof.

Figure 22 is a side elevation, partly in section, of an alternative form of mounting for the hydraulic totalizer controlling mechanisms.

Figure 23 is a sectional view of one form of check controlled totalizer mechanism.

Figure 24 is a sectional view thereof taken on the line 24—24 of Figure 23.

Figure 25 is a diagrammatic section view of a second form of check controlled totalizer mechanism.

Figure 26 is a sectional view thereof taken on the line 26—26 of Figure 25.

Figure 27 is a partial sectional view of a third form of check controlled totalizer mechanism.

Figure 28 is an elevation, partly in section, of the check feeding mechanism for check controlled totalizers.

Figure 29 is a diagrammatic illustration of an electrically controlled totalizer mechanism.

The ticket issuing machine

The mechanism of the ticket issuing machine and totalizer selector, as shown in Figures 1 to 12 inclusive, is supported in side frames 1 and 2, which are connected by end frames 3 and various cross members hereinafter described. Intermediate frame 4 is secured to the side frame 2 by bolts 5 and properly spaced therefrom by integral bosses or equivalent means. The forward lower extremity of the intermediate plate 4, as shown in Figure 5, is provided with a double elongated boss 6 into the left end of which is threaded a long flat-sided bolt 7 which thus assists in securing the intermediate plate 4 to the side frame 2. The left end of the bolt 7 has secured thereto a hub 8 upon which a roll of printed tickets may be mounted, said roll being guided by a guide plate 9 doweled to the boss 6, and by a retainer plate 10 fixed on the end of bolt 7 in any desired manner, as for instance, by means of a turn bolt 11 (see also Figure 1) pivoted on the end of bolt 7. As shown in Figures 1 and 2, an indicator arm 12 fixed upon shaft 13 rotatably mounted in the side frames is spring-urged (not shown) in the direction indicated by the arrow to bear with its lower end against the periphery of a roll of tickets supported on the hub 8 and thus to angularly position the arm 15 also attached to shaft 13, in accordance with the supply of tickets remaining on the roll. Pointer 16 mounted on arm 15 projects through an aperture in the casing, as shown in Figure 2, to indicate upon an appropriate scale the remaining supply of tickets.

Ticket strip feed

The ticket strip 19 from the roll mounted upon hub 8 is fed under the friction roll 20 (Figures 1 and 8) mounted upon plate 4 and over the feeding drum 21 (see also Figures 10 and 11) which has teeth 22 fixed therein to register with prepared apertures in the ticket strip and thus insure feeding without slippage.

To facilitate the threading of the tickets over the feeding drum, means are provided, as shown in Figures 10 and 11, whereby the drum may be manually rotated independently of the means normally used to drive it. The feeding drum 21 is rotatably mounted upon a shaft 23 and is provided internally with a spring tooth 24 engaging ratchet wheel 25 fixed on the shaft 23. This arrangement is such that when the ratchet wheel 25 is driven in a counter-clockwise direction by the means hereinafter described, the feeding drum 21 will be driven by means of the spring tooth 24. In threading the tickets over the drum, however, it may be rotated in the counterclockwise direction by means of the finger pieces 26, during which operation the spring tooth 24 rides freely over the teeth of ratchet wheel 25.

From the feeding drum 21 the ticket strip 19 (Figures 1 and 8) is looped downwardly under a resilient tensioning device (not shown), and thence passes into a throat formed by inlet guide member 30 and its side flanges 31, by which means it is guided upwardly into a horizontal path along which it is moved through the punch blocks for effecting the desired indications thereon, and thence to a cutoff mechanism adjacent the outlet guide plate 33. Above the ticket strip as it passes over the guide plate, is a center rail 34 (see also Figures 5, 8 and 9) supported at its opposite ends on cross members carried in the side frames. Together with similar members 35 and 36, this member 34 serves as a supporting track for the punching mechanism, and also cooperates with the feeding mechanism, serving to hold the ticket in proper position during such feeding operation.

Means are provided for automatically drawing from the ticket strip supply roll, a length equal to the length of one ticket during each operation of the general operator. This general operator comprises a long lever 50 (Figure 1) pivoted adjacent the right end of the machine as viewed in Figure 1, and adapted to be vertically reciprocated from the position in which it is shown in Figure 1, by means of a treadle mechanism adapted to lift rod 51 pivoted to the general operator at 52, or by equivalent means. Pivotally mounted on the general operator at 55, is a pair of links 56 supported and guided at their upper ends by a straddle link 57 (see also Figure 8) mounted on cross shaft 60 journaled in the side frame 2 and intermediate frame 4, and guided by ratchet wheel 61 fixed on the shaft. A pawl 58 pivoted on the upper end of links 56 is spring pressed into engagement with ratchet wheel 61, the teeth of which, conveniently, may be so spaced that each reciprocation of the pawl 58 advances the shaft 60 through one-sixth of a revolution. Also fixed upon the shaft 60 is a large gear 62 meshing with a gear 63 keyed to the shaft 23 upon which the feeding drum 21 is mounted. The ratio of these gears 62 and 63 is such that for each reciprocation of the links 56 the feeding drum 21 is advanced sufficiently to draw the ticket strip 19 the length of one ticket.

Also meshing with gear 62 is a small gear 64 (Figure 5) pinned to cam shaft 65 journaled in the side frames 1 and 2. The ratio of the gears 62 and 64 is such that for each reciprocation of the link 57 the cams on shaft 65 perform a complete cycle of operation. In the present disclosure this is accomplished by a complete rotation of shaft 65 but it is obvious that it may be accomplished by any fraction of a rotation by providing cams with duplicate rises.

Punching mechanism

Means, operated by this cam shaft 65, are provided for punching each ticket before issuance with an indication of the race for which the ticket is issued and the horse upon which it is issued. As shown in detail in Figure 9, each punch and die assembly comprises a punch block 100 having apertures therethrough adapted to receive punches 101 and 102. A plurality of types of punches, all adapted to fit these apertures, but having different types or sizes of operating ends, are adapted to be interchangeably inserted in this punch block. The upper surface of the block is recessed adjacent these apertures to receive a spring retainer cap 103, complementary grooves being provided in the cap and in the block whereby the cap may be removably locked in position by means of pins 104. The punches 101 and 102 are normally maintained in raised position by spring 105 compressed between the bottom of the block recess, and an apertured disk 106 underlying the enlarged heads of the punches and limited in its upward movement by contact with the inturned edges of the spring cap 103, the arrangement being such that the punches may be removed and replaced without moving the spring retainer cap 103. A die plate 107 apertured to fit the particular punches selected for a given period of operation, may be inserted and removably retained in the punch block 100 by means of a spring pressed bolt 108 pressed downwardly to engage an aperture in the die plate 107 by spring 109 compressed between the body of the punch block and a nut 110 on the bolt 108.

The two punch block assemblies 100A and 100B, each of which is mirror image of the other, are adapted to be moved laterally (as viewed in Figure 1) in order to bring their punches over the proper portion of the ticket to effect the desired indication, and for this purpose the punch blocks are provided with flanges 111 and 112. The flange 111 of the block 100A is adapted to ride along the rail 36 (see also Figure 12), and the flange 111 of the block 100B is adapted to ride along the rail 35. The flanges 112 of both blocks ride along the center rail 34. All the punches of both blocks are adapted to be depressed regardless of their lateral position by punch operating levers 115 (Figures 1, 5, 8, and 12) pivotally supported on rod 117, mounted in bearings 119, fixed to rails 35 and 36 respectively. Springs 120 compressed between the levers 115 and the rails 35 and 36, normally maintain the levers in raised position from which they are adapted to be depressed by a punch operating cam 125 mounted on the cam shaft 65. The right ends of levers 115 are connected together by a web 126 overlying all possible lateral positions of the two punch blocks 100A and 100B, and supported on a shaft 127 extending between the levers 115 adjacent the cam shaft 65 is a roller 128 adapted to be impinged by cam 125 as the shaft 65 rotates, thus carrying the web 126 downwardly and depressing all the punches 101 and 102. This cam is timed to depress the punches and to immediately permit them to rise again just prior to the operation of an intermittently operating strip feeding mechanism, after which the cutoff mechanism, all as hereinafter described, operates to sever the punched and ejected ticket.

Clamping mechanism

After the punching has been effected, a clamping device, which normally holds the ticket strip 19 against lateral movement, is released by the further movement of cam shaft 65, so that the aforementioned feeding means may eject the punched portion of the ticket strip. This clamping device comprises a shouldered clamping pin 130 (Figure 12) guided in member 132 and pressed upwardly by spring 134 compressed between said member and the pin shoulder so as to clamp the ticket strip 19 between the upper end of the pin and a cooperating member 135 fixed in the frame. At the proper time in the cycle of operation of cam shaft 65, the pin 130 is lowered, to release strip 19, by the following means.

On an upper extension of the intermediate plate 4 (Figure 1) is carried a clamp operating lever 137, pivoted on pin 138 carried in said plate 4 (see also Figure 8). After the punching operation, lever 137 is raised by clamp operating cam 140 (Figure 5) raising link 141 and rocking the lever 142, pivotally attached to the lower end thereof, counter-clockwise about its pivot 143 in the member 132. The opposite end of the lever 142 (see also Figure 12) overlies nuts 144 on the lower end of pin 130, so that such rocking of the lever lowers the said pin, compressing the spring 134 which normally holds it in raised positon, and releases the ticket strip so that the advancing mechanism can function.

Ejecting mechanism

While the strip is thus freed by the clamp, further rotation of the cam shaft 65 serves to advance the ticket strip through the punch blocks by the following means. As shown in Figures 1 and 5, a lever 150 is pivotally mounted at 151 on the side frame 2 and is adapted to be rocked upon rotation of the shaft 65 by means of a pin 152 carried by disk 153 mounted on said shaft (see also Figures 6 and 7). The lower end of lever 150 is connected by link 154 with a second lever 155 fixed on cross shaft 156 journaled in the side frames 1 and 2. Also fixed on shaft 156 adjacent its opposite end, is a lever 157 having a pawl 158 pivoted on its upper end and spring pressed for counter-clockwise movement limited by the pin which supports said spring. The leverages are so proportioned that, as the cam shaft 65 is rotated, lever 150 will be rocked to the right (as viewed in Figure 1) rocking levers 155 and 157 so that pawl 158 will engage one of the apertures in the ticket strip as is usual in the ticket punching art, advancing said strip to the right a distance equal to the length of one ticket. As shown in Figure 9, the end of pawl 158 is guided in a groove in the lower edge of center rail 34 during this operation. The linkage is then returned to its normal position by means of a spring, diagrammatically illustrated by an arrow in Figure 1, which urges lever 157 in the direction indicated by the arrow in Figure 1, and, the cam 140 having passed lever 137, the strip 19 is again clamped by pin 130 preparatory to the cutoff operation.

Severing mechanism

Means, operated by the further rotation of cam shaft 65, are provided for cutting off each ticket at the conclusion of this feeding operation. On the upper extension of intermediate plate 4 (Figures 1, 5, and 8) is also carried a cutoff lever 160 likewise pivoted on the pin 138 carried in said plate 4.

Cutoff lever 160 (Figure 5) overlies cam 162 and is adapted to be raised by said cam upon rotation of the shaft 65, raising by means of link 163, attached thereto, a knife blade 165 (see also Figure 12) pivoted at 166 in the side frame 1 and operating upon the ticket strip 19 adjacent the clamping pin 130 and member 135 so as to sever the strip at this point dropping the severed portion upon the outlet guide plate 33. At the conclusion of the severing operation, cam 162 passes lever 160 and the blade 165 is lowered by gravity.

*Locking mechanism*

Means under electrical control from a remote station are provided for locking the machine against operation. Pivoted on shaft 170 journaled in the side frame 2 and intermediate plate 4, is a lock lever 172. The lower end of this lever is notched to engage over an extension 174 formed on the general operator 50 and the lever 172 is spring urged into a position overlying this extension by a spring 176 compressed between an extension 178 of the intermediate frame 4 and a collar 180 formed on rod 181 pivoted at 182 to the link 172. The general operator 50 is thus normally locked against operative movement.

Solenoid 185 mounted on the side frame 2 is adapted upon energization to move its core 186 to the left (as viewed in Figure 1) and this core is connected by means of link 187 to lever 172 so that as long as the solenoid 185 is maintained energized, the lever 172 will be held in its unlocked position against the tension of spring 176, and so long as this condition is maintained, the general operator 50 may be freely moved. Stops 188 are provided on the rod 181 to limit leftward movement of the lever 172 by the solenoid 185.

*Race punching mechanism*

Since it is the practice to lock all ticket-issuing machines just prior to the commencement of each race, leaving them thus locked until it is time to commence the sale of tickets for the following race, and since the punch block 100B must be moved one step to the left (as viewed in Figure 1) for each successive race in order to properly indicate upon the ticket the race for which it is issued, the solenoid operated locking mechanism hereinbefore described, may be used to effect the step by step advance of the punch block 100B in the proper manner.

Pivotally mounted on the locking lever 172 is a pawl 190 spring pressed in the direction indicated by the spring diagrammatically illustrated by the arrow to cooperate with ratchet segment 191. As the spring 176 functions, therefore, to move the locking lever 172 into locking position with respect to the extension 174 of the general operator 50, pawl 190 being in engagement with the teeth of the ratchet segment 191 will rock the segment one tooth space in a counter-clockwise direction. Ratchet segment 191 (see Figure 5) is keyed to a shaft 193 journaled in the intermediate frame 4 and side frame 1 and keyed to the opposite end of this shaft adjacent the side frame 1 is a similar ratchet segment 194 cooperating with a holding pawl 195 pivoted to the frame 1 and spring urged in the direction indicated by the arrow. Also keyed to the shaft 193 is an arm 197 having a bifurcated upper end embracing a stud 198 on punch block 100B. This arrangement is such that the one tooth step advance of the ratchet 191 will effect a leftward movement of the punch block 100B by exactly the amount between successive race numbers on the printed ticket strip and the proper designating of the race for which each ticket is issued is thereby accomplished automatically from a remote station as an incident to the locking of the ticket issuing machines at the conclusion of ticket sales for a given race.

*Horse punching mechanism*

The punch block 100A for effecting an indication of the horse upon which each ticket is issued, may be set laterally to any desired position along the rails 34 and 35 by means of a handle lever 200 (Figures 1 and 5) fixed on a sleeve 202 mounted upon shaft 193. Also fixed to this sleeve 202 is an arm 206 having a bifurcated upper end embracing stud 208 on the side of punch block 100A. Handle lever 200 is provided with an indicator vane 210 which by alignment with indicia impressed upon the cover plate 211 indicates the lateral position of the punch block 100A with respect to the indicia printed on the ticket strip.

*Totalizer controlling mechanism*

It is desired to distribute and totalize the bet placed upon each horse in a given race, and for this purpose, means are provided whereby the movement of the handle lever 200 to position punch block 100A in registry with printed indicia representing a certain horse, will also effect selection of an electric circuit individual to the horse selected, and whereby operation of the general operator 50 will effect transmission of an electrical impulse through the circuit thus selected. Also fixed upon the sleeve 202 (Figure 5) which is adapted to be rocked by the handle lever 200, is an arm 215 having a bifurcated lower end engaging over a pin 217 on a selector carriage 220. A non-circular shaft 222 (see also Figure 1) is rockably mounted in journals 223 in the end frames 3 and supports the selector carriage 220 for lateral sliding movement by means of a guide collar 225 slidably fitted upon the shaft 222 and having a circular groove receiving the bifurcated arms of lug 226 secured on the under side of carriage member 220, the arrangement being such that, while carriage member 220 may be slid laterally along the shaft 222 as the handle lever 200 is adjusted, it will not be affected by rocking movement of the shaft 222.

A similarly operating guide collar 230 (Figure 2) supports the right end of member 220. Secured to this guide collar 230 by screws 232 (see also Figure 3) is a switch holder plate 234 in which female switch members 236 are mounted for limited rocking movement with respect to the shaft 222. As the carriage 220 is moved laterally along the shaft 222 by movement of the handle lever 200, the female switch elements 236 are moved laterally with respect to a bank of male switch elements 238 supported between appropriate insulating blocks by a bracket 239 and the end frame 3. Each of the male switch elements 238 is connected to a separate circuit individual to a given horse and connected to a remote totalizer adapted to totalize all bets made on that horse, as will be hereinafter explained.

Means are provided for rocking the shaft 222 by operation of the general operator 50. Fixed on shaft 222 (Figures 1 and 8) is a lever 240 having a socket adjacent its end in which is retained a ball 241 mounted in the end of the general operator lever 50, the arrangement being such that the raising of the general operator lever 50 imparts a clockwise movement to shaft 222 (as viewed in Figure 8). Upon such movement of the shaft 222 the insulating bushing around screw 232 adjacent the female switch member 236 carries said members into contact with the male switch member 238 with which it is aligned at the time, thus completing a circuit controlling a remote totalizer associated with the particular horse upon which the bet has been placed. As the general operator lever 50 returns to normal position, a return rocking movement is imparted to the shaft 222 but female switch elements 236 continue to grip the male switch element 238, tensioning spring 245 tensioned between the female switch elements 236 and an extension of plate 234 until the insulating bushing of another of the screws 232 adjacent the female switch elements 236 contacts the sides thereof, positively breaking the circuit, whereupon the spring 245 will carry the elements 236 away from the element 238 breaking the circuit with a snap action.

Means are also provided whereby the tickets issued upon each horse may be totalized individually upon mechanical counters within the ticket issuing machine. Screws 232 also secure to the collar 230 a counter operating plate 250. Mechanical counters 251 adapted to be actuated by rocking movement of this plate, are arranged in echeloned banks as shown in Figure 2, and their operating shafts are provided with arms 252 (see also Figure 3) extending into the path of rocking movement of pins 254 carried upon plate 250. The lateral offset of the arms 252 is such that only one of said arms can be in operating alignment with a pin 254 at one time, and since plate 250 is cut away (as shown in Figure 3) so as to pass freely between the operating arms 252 during its lateral adjustment, it is evident that lateral movement of the carriage 220 will effect selection of a counter arm 252 for operation in the same manner that a switch member 238 is selected. Thereafter, as the shaft 222 is rocked by movement of the general operator 50, one of the pins 254 will be moved down upon one of the arms 252 oscillating it the proper distance to advance the counter associated therewith one step.

It is also desirable to effect a totalization upon a remote totalizer of all tickets issued by all ticket issuing machines, and for this purpose a switch member 238A in each machine is connected into the circuit controlling the remote grand totalizer. Closure of this circuit is effected each time the general operator 50 rocks the shaft 222 by means of a switch 236A the supporting structure for which is fixedly mounted on shaft 222 but which is otherwise identical in construction with that of the switch element 236.

Likewise, it is desirable to totalize the total number of tickets issued by a given machine, and for this purpose, a mechanical totalizer 251A is provided which is operated each time the shaft 222 is rocked by a stationary counter operating plate 250A fixed to the shaft 222, but otherwise operating its counter 251A in the same manner that the counters 251 are operated by the laterally shiftable plate 250.

Control of remote totalizers

The control of remote totalizers by contacts 236—238 and 236A—238A of each ticket issuing machine, may be effected through circuits such as are shown in Figure 13. In this figure three ticket issuing machines are shown, each adapted to issue tickets of a single denominational value upon any of the plurality of participants in each contest. One machine, for instance, may be adapted to issue two dollar tickets, another to issue five dollar tickets, and a third to issue ten dollar tickets, it being understood, of course, that several machines may be provided for each denominational value.

As illustrated in this figure, the bank of solenoids under the legend "Grand total" is adapted to control a totalizer registering the grand total of the amount of all tickets issued by all the ticket issuing machines in the system, less the amount of the "commission" accruing to the authority operating the machines, which is automatically subtracted as hereinafter described. Each of the solenoids in this bank is connected to the grand total controlling contact 238A of one of the ticket issuing machines, as shown.

Also, as illustrated in this figure, the banks of solenoids appearing under the legends "$H_1$" to "$H_4$" inclusive are each adapted to control a separate totalizer for registering the total amount of the tickets issued by all the machines in the system upon one of the participants in the contest. For this purpose the solenoids of the bank $H_1$ are shown as each connected to the first contact of the bank 236 in one of the ticket issuing machines. Likewise the solenoids of the bank $H_2$ are shown as each connected to the second contact in the bank 236 of one of the ticket issuing machines, and so on, a bank of such solenoids being provided for each of the participants in the contest. Additional unconnected solenoids are shown in each of these banks indicating the adaptability of the system to a greater number of ticket issuing machines either of the same or other denominations than those shown.

The general arrangement being as described in connection with Figure 13, it is necessary that the totalizing apparatus be so constructed as to register accurately even though a plurality of solenoids in any of the banks are operated simultaneously and a plurality of types of mechanisms for effecting such totalization are described hereinafter.

Hydraulic totalizer control

Figures 14 to 20 inclusive illustrate such a totalizer in which the addition of amounts is effected by transferring fluid from a supply line to a previously filled registering header in measured quantities directly proportionate to the denomination of the ticket issued, and causing an indicator to be displaced along a scale as the quantity of fluid in the registering header is thus increased.

Each such totalizer employs a bank of pumps 300 adapted to be operated by a bank of solenoids 302 corresponding to one of the banks shown in Figure 13. As shown in Figure 17 each of these pumps is adapted to transfer a measured quantity of fluid from a supply line 305 to a previously filled registering header 307 whenever the particular solenoid associated therewith is energized by the closure of its controlling switch in the ticket issuing machine.

As shown in Figure 18, each of the pumps comprises a cylinder 310 communicating at its upper end with the registering header 307 through an adjustable spring check valve 312 which remains closed except during the pressure stroke, and communicating at its side with supply line 305, through spring check valve 314 which remains closed except during the suction stroke. A piston 316 is slidably mounted in this cylinder and, as shown in detail in Figure 19, carries on its inner end a rubber sealing cup 317 attached by vulcanization to a flanged and headed pin 318 adapted to be threaded into the end of the piston 316.

Adjacent the lower end of the piston a disk 320 is held in place between a ledge formed on the piston rod by reducing the diameter of the end portion thereof, and a rectangular block 322 held against the opposite side of said disk by a nut 324 threaded onto the end of piston rod 316. Attached to opposite sides of this block 322, are operating bars 326 attached to the core of one of the solenoids 302, the arrangement being such that upon energization of the solenoid 302, the piston 316 is moved in a rightward direction (as viewed in Figure 18) forcing the liquid filling the cylinder 10 past the check valve 312 into the registering header 307. Upon deenergization of the solenoid, the pressure of liquid in the supply header 305, which is maintained under suitable priming pressure, is sufficient to raise the inlet check valve 314 refilling the cylinder 310 with fluid and insuring the return of the piston 316 to the position in which it is shown in Figure 18. As shown in Figure 18, each pump 300 is arranged to feed liquid in an upward direction into registering header 307. Likewise the registering header maintains such an upward gradient toward the totalizer as to make the entrapment of bubbles, at any point in the system, impossible. As hereinafter described, bubbles entering the system at any point will be exhausted from the system during each resetting operation, all the gradients of the system being designed to convey them to the resetting valve.

The amount of fluid injected into the registering header 307 upon each operation of the piston is controlled by an interchangeable bracket 330 having a flange 332 adapted to limit the pressure stroke of the piston 316 by contacting one side of the disk 320 and a flange 334 adapted to limit the return, or suction stroke of the piston 316 by contacting the opposite side of said disk 320. Thus the distance between the flanges 332 and 334 determines the amount of fluid which will be injected into the registering header 307 by each energization of the solenoid 302. Flange 332 is provided with an open-ended slot adapted to fit over the piston rod 316 and flange 334 is provided with a similar open-ended slot (as shown in detail in Figure 20) adapted to fit over the block 322. The entire bracket 330 is held in place in its proper position on the pump structure by bolts 336 and is thus adapted to be removed and replaced by a bracket of similar construction but having a greater or lesser space between the flanges 332 and 334 whenever it is desired to connect the controlling solenoid 302 of a given pump to a ticket issuing machine issuing tickets of a different denominational value. An example of this differential spacing may be seen by comparing the bracket 330 of Figure 18 with those of Figure 17 from which it will be evident that the brackets of Figure 17 (in which the pumps are shown in half-stroke position), permit a considerably greater amplitude of movement of the piston and will therefore permit the injection of a larger amount of fluid into the registering header. Thus, for a machine issuing two dollar tickets, a bracket 330 of the flange spacing shown in Figure 18 might be used, while for a five dollar ticket machine, one with spacing such as that shown in Figure 17 might be used.

The brackets 330 controlling pumps associated with the "Grand total" register are especially designed to cause the amount of the operator's "commission", taxes, et cetera, to be automatically subtracted from the amount registered, and for this purpose the space between their flanges 332 and 334 is made smaller than the corresponding space on other brackets in proportion to the percentage to be so deducted.

As indicated in Figure 17, as many of these pumps may be connected between a single supply line 305 and a single registering header 307 as there are ticket issuing machines in the entire system. Separate systems are of course provided for each "pool," as for instance for "win," "place," and "show" pools.

Alternatively, as shown in Figure 20, the pump 300 may be operated by power under solenoid control rather than directly by the solenoid. As shown in this figure, each of the solenoids 302 is provided with a hook-shaped end 301 on its core, said end being adapted to cooperate with a live point 303 pivoted at 304 on clutch controlling lever 306 and normally held in extended position with respect to lever 306 by a spring 308 tensioned between the lever and the last point. This construction is such that as the solenoid 302 is energized and its core is thus pulled upwardly, hook-shaped end 301 will engage the underside of live point 303 pulling it upwardly. Counter-clockwise movement of the live point 303 around its pivot 304 is prevented by the flange 303A of the live point which lies along the upper edge of lever 306 and hence the live point 303 and lever 306 will be rocked as a unit around the pivot 309 of the lever 306 until the hook-shaped end 301 passes off the end of the live point 303, whereupon the lever 306 will be returned to normal position by the spring which normally urges it in the direction indicated by the arrow. Lever 306 thus returns to normal position immediately after it is rocked although the solenoid may be maintained energized for some time thereafter. When the solenoid is finally deenergized the hook-shaped end 301 of its core comes into contact with the upper side of live point 303, rocking it clockwise around its pivot 304 without disturbing the positioning of the lever 306, and the mechanism is thus conditioned for subsequent operation.

Rocking of the lever 306 in a counter-clockwise direction causes engagement of a one-revolution clutch (see also Figure 21) comprising eccentric 311 freely mounted on constantly rotating power shaft 313, which shaft is provided adjacent the eccentric with a pin 315 adapted to engage a pawl 319 pivoted in the eccentric 311 and adapted to be spring pressed into the path of the pin 315 upon removal of the end of the lever 306 from standing relation therewith.

This arrangement is such that upon counter-clockwise rocking movement of the lever 306, the pawl 319 is spring pressed into the position which is indicated in dotted lines in Figure 21 where it is engaged by pin 315 on the rotating shaft 313, thus driving the eccentric 311 in a counter-clockwise direction, as viewed in Figure 20. The live point construction 303 hereinbefore described, permits the lever 306 to return to normal position as soon as the pawl 319 has been carried away from its opposite end so that when at the conclusion of one rotation of the eccentric 311, the head of pawl 319 engages the end of lever 306, the pawl will be driven back into the recess in eccentric 311, disengaging it from the driving pin 315 and bringing the parts controlled by eccentric 311 to rest.

Each rotation of the eccentric 311 imparts a complete reciprocation to the piston rod 316 injecting a measured quantity of fluid into the registering header 307 in the manner described in connection with the solenoid operated pumps, hereinbefore. Detachably mounted on the end of piston rod 316 by means of bolts 321 is a changeable stroke controlling block 323 having interior machine spaces 325 and 327 adapted to cooperate with the periphery of eccentric 311 to control the length of stroke of piston rod 316 which will be imparted by each rotation of eccentric 311. The block 323 shown in Figure 20 has its faces 325 and 327 in contact with the peripheral surface of eccentric 311 and will therefore cause a maximum stroke of piston rod 316 upon each rotation of eccentric 311, but it is contemplated that other blocks 323 may be substituted having their faces 325 and 327 spaced more widely, so that the eccentric 311 may have a predetermined amount of lost motion before it contacts the face 325 to draw the piston rod 316 upwardly and by this means provision is made for proportioning the amount of fluid injected into registering header 307 to the value of ticket issued by the machine connected to solenoid 302.

The induction of air into the lower end of cylinders 310 may be effectively prevented by (as shown in Figure 22) enclosing the lower end of said cylinders in a casing 328 adapted to be filled with fluid up to a level above that of the opening in the lower ends of cylinders 310. In this arrangement pistons 316 may be operated by means such as a lever 329 pivotally mounted in the casing 328 and reciprocated either by direct solenoid drive in the manner illustrated in Figure 18, or by the clutch controlled eccentric illustrated in Figure 20. In this embodiment a spring 331 compressed between the casing 328 and a cap 333 on piston rod 316 is used to effect the suction stroke of the pump following each positive pressure stroke effected by lever 329.

*Hydraulic totalizer mechanism*

The increase in the volume of fluid in the registering header 307 effected by operation of the pumps 300, as hereinbefore described, effects the advance of an indicator over a properly calibrated scale by means of the mechanism illustrated in Figures 14 to 16, inclusive.

Pointer 340 is fixed on plate 342 and extends through a vertical slot 343 in the supporting wall 344 of the totalizer structure into juxtaposition with scaled indicia 346 calibrated to represent the cumulated value of all sums wagered under a given classification, as upon a certain participant in a contest. Plate 342 is supported by springs 348 which are in turn connected to parallel wires 350 held taut by said springs 348 and passing over upper and lower pulleys 352 rotatably mounted in brackets 354 attached to the main frame of the apparatus.

Supported in the path of movement of one of these wires 350, is a registering cylinder 357 supported in a vertical position by lower cylinder block 359 and upper cylinder block 360 attached to the main frame of the device. A piston 362 slidably mounted with the cylinder 357 comprises rubber cups 364 separated by a spacer disk 365 and held between lower cylinder block 367 and upper cylinder block 368 by means of a central screw 370 passing into the upper and lower blocks and through the spacer block 365 and cups 364.

An end of one of the wires 350 passes through an appropriate packing chamber 372 in the upper cylinder block 360 and is attached to the upper piston block 368, while the opposite end of said wire 350 passes into the lower end of cylinder 357 and is attached to the lower piston block 367. This arrangement is such that as the piston is lowered in the cylinder the wire 350 attached thereto will be correspondingly moved and the pointer 340 will ascend its scale 346. The other wire 350 supporting the pointer 340, is not attached to the piston and merely moves freely over its pulleys 352 as the plate 342 supporting the pointer moves.

For the purpose of resetting this registering apparatus to zero, means are provided for permitting liquid to escape from the upper cylinder block 360 into the tank which supplies the pumps 300 through the supply header 305. At the highest point of the chamber 375 in the upper cylinder block 360, the chamber communicates with a passage 377 which is normally closed by valve 378 slidably mounted in the cylinder block and held upon its seat by spring 379 compressed between the cylinder block 360 and a flange near the base of the valve stem. Since a plurality of said registering devices are ordinarily operated in banks, it is desirable to effect control of the resetting valve 378 by movement of a universal bar which will open them all simultaneously. For this purpose there is carried upon the side of each cylinder block, a valve controlling lever 380 pivotally mounted at 382 between plates 384 secured to the cylinder block at 386. One arm of the lever carries an adjustable screw 388, the head of which is adapted to contact the end of the valve stem 378 and move the valve from its seat when the lever 380 is rocked in a counter-clockwise direction as viewed in Figure 14. The other arm of said lever 380 is notched to the receive a pin 389 carried in universal bars 390 which are provided with similar pins 389 for operating the levers 380 associated with the remaining registering devices of the bank. This arrangement is such that upon leftward movement of the universal bars 390, as viewed in Figure 15, the levers 380 will be rocked in a counter-clockwise direction, depressing the valves 378 and permitting fluid to flow out of the chambers 375 of cylinder blocks 360 into the main supply tank.

As valves 378 are opened, fluid is injected under pressure into cylinders 357 below pistons 362. For this purpose, there is provided a two-way valve 361 (Figure 14) adapted to place the cylinder 357 in communication with either tube 363 connecting with any source of fluid under pressure, such as, for instance, the same source to which supply line 305 is connected, or with tube 366 connecting with the open sump to which passage 377 conveys exhausted fluid from the cylinders.

Thus when valve 361 is set one way, fluid under pressure will be admitted to the cylinder 357 below the piston 362 and will raise the piston, forcing fluid out through passage 377, valve 378 being open. When valve 361 is set the other way, the fluid below the piston 367 may be ejected from the lower part of the cylinder 357 as it enters the upper part through registering header 307. Valve 378 is located at the high point in the system so that any entrapped bubbles may be removed during each resetting operation.

As the operation proceeds, it is apparent that pointer 340 will move toward the zero point of the scale 346 as piston 362 rises in the cylinder 357. Upward movement of this piston in the cylinder is limited by the impingement of an accurately machined surface on the periphery of the upper piston block 368 against a complementary ground surface on the upper cylinder block 360 so that the egress of fluid is arrested when this zero point is reached.

At this point the chamber 375 of the upper cylinder block 360 and the registering header 307 are both completely filled with fluid and the resetting valve 378 will be closed by a rightward return movement of the universal bars 390. Thereafter, operation of the registering pumps 300, either singly or concurrently, by transferring liquid from the supply line 305 into the registering header 307 will force additional liquid into the chamber 375 of the upper cylinder block 360, forcing the piston 367 downwardly in the cylinder 357 and causing pointer 340 to travel upwardly along the scale 346 a distance proportionate to the amount of liquid thus transferred. By this means a cumulative registration is secured of the values represented by all tickets issued by the ticket issuing machines of the system upon the contest participant represented by each of the totalizers, and by connection of one such totalizer as a grand totalizer in the manner indicated in Figure 13, a grand total of the value of all tickets issued by all ticket issuing machines on all contest participants, less a predetermined percentage for commissions, taxes, et cetera, may be secured. In this way the odds payable on each winning ticket are determinable by direct reading of the "Grand total" register indication as the numerator, and of the winning contestant's totalizer as the denominator of a fraction which represents said odds.

Ball totalizer control

Figures 23 to 28 inclusive illustrate a totalizer in which the addition of amounts is effected by transferring checks, preferably in the form of balls, from a supply hopper or hoppers to totalizing devices adapted to be actuated or controlled by the passage of such checks.

Control of these devices may be effected by arranging the solenoids of Figure 13, in the manner illustrated in Figure 28 so that, upon energization, each will cause a predetermined number of balls to be removed from the general supply and transferred to the accumulation of such balls which may be awaiting passage through the totalizing device. In this arrangement it is apparent that any number of the solenoids may be operated simultaneously, since the balls will merely accumulate at the inlet of the totalizer and feed through it in proper order.

As shown in Figure 28 illustrating a single unit of such a control device, a line of balls 451 are fed from an elevated supply hopper (not shown) along the sloping grooved track member 453, the line being arrested when the foremost ball impinges stop member 455 carried by the main frame. Supported on the stop member 455 is one of the solenoids 457, the armature of which is connected by link 458 with lugs 459 formed on the side of a sleeve 460 rockably mounted on shaft 461 mounted in the frame. Sleeve 460 is provided with a wing 463 which, in its position of rest, lies alongside the balls on track 453. This wing may be of any of various lengths depending upon the denomination of ticket issued by the machine to which the solenoid 457 is connected.

As illustrated in this figure, the wing 463 is of a length sufficient to contact five of the balls 451 lying on track 453 which indicates that the solenoid 457 is connected to a machine issuing five dollar tickets, but it is contemplated that the wing 463 may be made in other lengths for contacting a greater or lesser number of balls when the controlling solenoid 457 is connected to a machine issuing tickets of larger or smaller denominations, respectively. By endwise movement of shaft 461 and one of the solenoid connecting pins, sleeve 460 may be removed and a similar sleeve having a different length of wing 463 may be substituted.

Upon energization of solenoid 457 by closure of contacts 236 and 238 of the ticket issuing machine, an upward pull is exerted upon link 458 rocking sleeve 460 and carrying its wing 463 across the track 453 with a sweeping movement. Balls 451 lying in this path of movement of wing 463 are thus swept sideways off the track 453 and drop upon the sloping apron 464 which is formed so as to convey them to the inlet throat 465 of the totalizing mechanism, hereinafter described.

In assembling a system of such mechanisms, solenoids 457 are connected according to the circuit diagram of Figure 13 in the same manner as are the solenoids 302 of the hydraulic totalizer mechanism heretofore described.

Ball totalizer mechanisms

In order to secure greater speed and positiveness of operation than would be possible were the balls fed through the totalizer mechanism by gravity alone, means are provided for accelerating their passage by power driven mechanism.

Referring to Figure 23, as balls 451 drop into the inlet throat 465 of the totalizer mechanism they encounter a power driven disc 467, rotating counter-clockwise as viewed in this figure, and provided with a series of peripheral notches 469 into each of which one ball is adapted to seat. As the disc 467 rotates the balls in the inlet throat are successively picked up, and they are held in these notches by the inner cylindrical wall 470 of the casing in which the rotating disc is mounted until they have been carried past the totalizing mechanism hereinafter described, after which they are positively ejected into outlet throat 472 upon encountering curved fingers 474 lying alongside disc 467 adjacent the enlarged outlet throat.

The depth of notches 469 is equal to or greater than the diameter of the balls 451, but they are positively cammed into the outlet throat 472 without the possibility of jamming disc 467 by fingers 474. The advancing side of each notch conforms closely to the curvature of the balls and the balls are fed into the notches at such a point that there is no reversal of the direction of their movement as they pass into the inlet, are driven through the passage around the disc, and pass into the outlet throat. Hence they can not be thrown back up the inlet throat.

In order to effect faster and more positive movement of the balls at increased speeds of the drive 467, and to insure proper feeding at the inlet throat 465 an auxiliary device for drawing the balls 451 into engagement with disc 467 may be provided. Such an auxiliary device is illustrated diagrammatically in Figure 25 as comprising a magnet 475, constantly energized, and so placed as to pull balls 451, of magnetic material, downward in the inlet throat 465 and to hold them in engagement with disc 467.

The totalizing mechanism actuated upon such operation of the ball feeding devices may be of any of a plurality of types, examples of which are illustrated in Figures 23 to 27 inclusive.

In the form illustrated in Figures 23 and 24, disc 467 is of non-magnetic material, such as brass, while balls 451 are of magnetic material, such as steel. Coil 477, in which a constant, direct current flows, is provided with an open core 479, the opening of which embraces a part of the path traversed by balls 451 as they are being driven by disc 467. This arrangement is such that the passage of each ball across the gap of core 479 will vary the flux produced by the current in coil 477 and thus induce a transient current impulse in coil 481 which also surrounds core 479, actuating a sensitive relay operated magnetic counter of any well known type, illustrated diagrammatically at 483.

The form illustrated in Figures 25 and 26 is substantially similar to the form just described except that the coils 485 surrounding core 486 are adapted to be energized by alternating current from transformer 487, and the said core is therefore formed with an opening lying along the balls' path for a sufficient distance to insure modification of the flux and consequent deflection of the relay operating counting device 490, even though the current in coil 485 be at zero at the instant the ball enters the core gap. For this purpose it is necessary to proportion the length of the core gap along the ball path to the speed of the disc 467 so that a ball can not pass from end to end of said gap in less than one complete cycle of alternation of the current.

In the form illustrated in Figure 27, balls 451 being positively driven by disc 467 directly engage and operate a toothed counter-wheel 492 rotatably mounted on shaft 494 which is connected to a mechanically operated counter of any desired type, preferably provided with mechanism for carrying over from order to order in the usual manner. This arrangement is such that, unless balls 451 are introduced, disc 467 may rotate freely without affecting counterwheel 492, but so that the introduction of balls 451, as shown, effects a positive driving connection between disc 467 and counterwheel 492 transmitting the power used to drive the disc to the counting device.

Automatic subtraction of the operator's commission, taxes, et cetera, in the grand totalizers of these constructions may be accomplished by gearing the totalizer drive mechanism appropriately, or by proper calibration of the registering dials of such totalizers.

Electrical totalizer

An example of an entirely electrical arrangement for entering upon a single totalizer a total of the value of tickets issued by a plurality of ticket issuing machines is illustrated in Figure 29.

As shown in this figure, the circuit including contacts 236 and 238 in each ticket issuing machine is closed by means of a lever 501 adapted to be rocked by a cam 503 slidably mounted upon the rockable non-circular shaft 222 (see Figures 1 to 3) of each ticket issuing machine, and adjustable thereon by means such as carriage member 220. When shaft 222 is rocked in the direction indicated by the arrow in Figure 29, as an incident to the punching of a ticket, cam 503 depresses the end of one of a series of such levers 501, equal in number to the number of contacts 238 provided in each ticket issuing machine, and carries the other end of said lever against a plate 505 raising it into contact with contacts 236 and 238.

Means are provided for holding the circuit thus established, until the totalizer is operated. Plate 505 is attached to the armature of a holding coil 507, so arranged that upon bridging of the contacts 236 and 238 by plate 505 the coil 507 will be energized and will hold closed the circuit from supply line 509, through contacts 236 and 238, through contacts 511 and 512 which are normally closed by plate 513, and through solenoid 515 to ground.

The core solenoid 515 is pivoted at 517 to a lever 518 pivotally mounted on the supporting frame at 519 and spring urged in the direction indicated by the arrow. A shoe formed on its remote end rides against the periphery of a disc 520, of insulating material, which is rotated by power driven means. This arrangement is such that although the energization of solenoid 515 tends to overcome the spring on lever 518 and move plate 513, attached to the near end of lever 518, away from contacts 511 and 512 to break the held circuit, such movement is blocked by the impingement of the remote end of lever 518 against the periphery of disc 520. The circuit thus remains closed until the totalizer is operated as will be described.

A magnetic device 525 connected to operate a counting mechanism of any desired type, is included in a separate circuit adapted to be closed by contact between one end of lever 518 and a metallic plate 527 carried in a depression 528 in the periphery of disc 520. As this disc rotates, lever 518 will be urged into contact with plate 527 by the solenoid 515 if it has been previously energized, thus completing the second circuit for energizing magnetic device 525. If the solenoid 515 has not been previously energized, however, lever 518 will not be moved into contact with plate 527.

Plate 527 being located in a depression 528 in the periphery of disc 520, the movement of lever 518 into contact with the plate requires sufficient movement thereof to carry plate 513 away from contacts 511 and 512, thus breaking the holding circuit, and deenergizing the holding magnet 507 to permit plate 505 to drop away from contacts 236 and 238. This circuit is then in condition for further operation.

As illustrated, duplicate assemblies including the lever 518 may be placed at sufficient intervals around the periphery of disc 520 to allow for proper operation of the magnetic device 525, taking into consideration the speed of operation of the disc, which should make a complete rotation in less time than is required for complete operation of a ticket issuing machine.

To insure against a second operation of a given ticket issuing machine before disc 520 has rotated sufficiently to effect registration of the first amount, the ticket cut-off mechanism or a lock such as the lock 172 in a machine, illustrated, diagrammatically in Figure 29 by member 530 may be set by the cam 503 and held in locking position by the energized solenoid 507 until the holding circuit is broken upon the completion of the circuit operating magnetic device 525.

Operation

At the opening of betting on the first race, all the ticket issuing machines are unlocked by pressing a button in the calculating room to energize the circuit including the solenoids 185 of all machines and maintain them energized until betting on the first race is concluded.

As bets are placed, each ticket issuing machine is set, by means of handle lever 200 to indicate the proper horse and thus to set the punch, counter selector, and switch selector correspondingly. Operation of the ticket issuing machine then issues a properly punched ticket to the wagerer, operates the individual machine counters, and controls the selected totalizer and grand totalizer to register the bet.

Betting may be continued up to the start of the race, when the ticket issuing machines may be locked by operation of a button, located in the judges stand, to interrupt the circuit including the solenoids 185 of the ticket issuing machines, whereupon they will be automatically locked when the general operator of each returns to home position. In this way, issuance of tickets which are in the course of being issued at the time this button is pressed may be completed.

The totalizers are then checked by copying off the totals appearing on the counters 251 of each ticket issuing machine and resetting them to zero, after which the machines may be unlocked for betting on the next race by operation of the calculating room button as above described. Operation of the machine locks will have advanced the race punch so that all tickets thereafter issued will be punched at the next succeeding race number.

Although certain specific embodiments of the invention have been disclosed herein, it will be apparent that many modifications thereof are possible. The invention, therefore, is not to be restricted except insofar as is necessitated by the prior art and by the spirit of the appended claims.

We claim:

1. A machine of the character described including a selectively adjustable recording mechanism, operating means therefor, devices for feeding ticket material to said recording mechanism, a main drive shaft operatively connected to the recording mechanism and the feeding devices to operate the same in synchronism upon operation of said shaft, means for adjusting said recording mechanism step by step to record progressively differing data on said ticket material, means for locking and unlocking said main drive shaft, and means operated by said last named means for actuating said adjusting means.

2. A machine of the character described including a selectively adjustable recording mechanism, operating means therefor, devices for feeding ticket material to said recording mechanism, a main drive shaft operatively connected to the recording mechanism and the feeding devices to operate the same in synchronism upon operation of said shaft, means for adjusting said recording mechanism step by step to record progressively differing data on said ticket material, electromagnetic means operable from a remote station for locking and unlocking said main drive shaft, and means operated by said last named means for actuating said adjusting means.

HORACE L. HIRSCHLER.
FULLER A. CROOKS.
FRED K. R. RICHTER.